United States Patent [19]

Suzuki

[11] Patent Number: 5,068,926
[45] Date of Patent: Dec. 3, 1991

[54] FLUSH TOILET

[76] Inventor: Kaneyuki Suzuki, 4726-5, Ooaza Nagakura, Karuizawa-machi, Kitasaku-gun, Nagano-ken, Japan

[21] Appl. No.: 474,337

[22] Filed: Feb. 2, 1990

[30] Foreign Application Priority Data

Feb. 10, 1989 [JP] Japan ................................. 1-32493

[51] Int. Cl.⁵ ...................... E03D 5/016; A47K 11/02
[52] U.S. Cl. ......................................... 4/318; 4/111.5; 4/DIG. 19
[58] Field of Search ............................ 4/111.1–111.6, 4/318, 317, 321, 322, 319, DIG. 17, DIG. 19, 320, 436

[56] References Cited

U.S. PATENT DOCUMENTS

| | | | |
|---|---|---|---|
| 3,474,468 | 10/1969 | Blankenship | 4/111.5 |
| 3,673,614 | 7/1972 | Claunch | 4/111.2 X |
| 3,733,617 | 5/1973 | Bennett | 4/111.1 |
| 3,816,857 | 6/1974 | West, Jr. | 4/111.2 |
| 4,040,956 | 8/1977 | Selwitz | 4/318 |
| 4,063,315 | 12/1977 | Carolan et al. | 4/DIG. 19 |
| 4,070,714 | 1/1978 | Bishton, Jr. et al. | 4/318 |
| 4,161,792 | 7/1979 | Dallen et al. | 4/111.1 |
| 4,162,656 | 7/1979 | Dallen et al. | 4/111.1 |
| 4,222,130 | 9/1980 | Roberts | 4/318 |
| 4,546,502 | 10/1985 | Lew | 4/111.1 |
| 4,561,132 | 12/1985 | Lew et al. | 4/321 |

Primary Examiner—Henry J. Recla
Assistant Examiner—Robert M. Fetsuga

[57] ABSTRACT

A flush toilet of the present invention has a toilet stool and an incinerating pot, they are connected to each other by a vertical drain pipe. A shutter is provided which opens the drain pipe during discharge of waste material and closes after completion of the discharge. The shutter is positioned approximately midway of the drain pipe. Raw sewage can be delivered to the incinerating pot, and flush water can be introduced to another location. By introducing flush water to another location, only raw sewage or other waste material can be efficiently incinerated. The flush water used can be reused as flush water after filtration with a filtering apparatus.

8 Claims, 9 Drawing Sheets

FLUSH TOILET

BACKGROUND OF THE INVENTION

1. Field of the Invention

The present invention relates to a flush toilet which can easily incinerate solid waste such as raw sewage.

2. Description of Background Art

There are three major methods for dealing with raw sewage. The first method provides for impounding sewage in a sewage reservoir at each individual house with periodical collecting by a tank truck for collecting sewage in order to convey the sewage to a sewage disposal facility.

The second method provides for conveying raw sewage with water from each individual house to a sewage disposal facility via a sewer system. This method has been especially adopted in urban areas.

The third method provides for impounding raw sewage in a septic tank to purify the raw sewage by microorganisms such as bacteria.

In the first method, a bad smell is emitted. Thus, neighbors are inconvenienced when raw sewage is collected from the reservoir. In addition, the tank truck is required to periodically travel to each house so as to collect sewage at each house. In this way, a large expense including labor cost and maintenance cost of the tank truck is required. Additionally, by impounding raw sewage in the reservoir an uncomfortable bad smell is always emitted in and around the toilet.

In the second method, raw sewage can be conveyed to the sewage disposal facility with a large quantity of water via the sewer system. The raw sewage which is conveyed is treated in various ways in the treatment facility. For example, raw sewage may be disintegrated by adding chemicals, heating, pressurizing or using bacteria. Supernatant water introduced into a settling pond is chlorinated, and then is discharge to a river. The sludge deposited in the pond is incinerated or is used as a land fill after dehydrating. The cost of this method will be huge, and uncomfortable and a bad smell is emitted in and around the treatment facility. Conditions on the location of the treatment facility is limited.

In the third method, raw sewage is fermented and disintegrated by bacteria. However, a large amount of water is required. In cold areas, or during a cold season, the activity of the bacteria is weakened so that the amount of disintegration is reduced. The water which is purified is percolated in the ground through a filter. However, the filter may become clogged when water purification is imperfect. In a place where water percolation is unsatisfactory because of base rock or a clay layer under the ground, water and raw sewage should be collected by a tank truck in order to convey the sewage to a sewage disposal facility. Further, in the case of a hotel in a tourist area or a health resort, the amount of raw sewage often is beyond capacity of a septic tank when many tourists are visiting. Thus, raw sewage which may be half disintegrated runs over the tank.

OBJECT AND SUMMARY OF THE INVENTION

The main object of the present invention is to provide a flush toilet, which can easily incinerate solid waste such as sewage and which can reuse flushed water by filtering.

The flush toilet of the present invention comprises an incinerating pot for incinerating solid waste such as sewage arranged below a toilet stool, a drain pipe is provided for vertically connecting the incinerating pot and the toilet stool, a shutter is arranged across the drain pipe downstream of the toilet stool and approximately midway along the length of the drain pipe, the shutter opens the drain pipe during disposal of the solid waste and closes after completing disposal of the solid waste. A branch pipe is attached to the drain pipe above the shutter in order to introduce water flushed apart from solid waste.

The flush toilet may have two shutters. In this embodiment, a first shutter is arranged across the drain pipe downstream of the toilet stool and approximately midway along the length of the drain pipe. The first shutter opens the drain pipe during disposal of solid waste and closes after completing disposal of solid waste. A second shutter is arranged across said drain pipe downstream of said first shutter along the length of the drain pipe. The second shutter closes the drain pipe while the first shutter closes the drain pipe and opens the drain pipe after the first shutter closes the drain pipe.

The flush toilet may have a structure wherein the branch pipe is connected to a filtering apparatus, and the toilet stool and a tank for impounding water filtered by the filtering apparatus are connected to each other by a return pipe.

The flush toilet may have an incinerating pot with an inner center part formed downstream, and may further comprise a fan for agitating sewage, etc. in the incinerating pot. A device may be provided for sucking ash, with a lower end of the device being arranged in the incinerating pot.

The flush toilet may further comprise means for introducing other solid waste such as garbage, etc. in addition to sewage into the incinerating pot, whereby garbage, etc. can be incinerated with or without sewage.

The flush toilet of the present invention with the above stated structure has the following advantages.

Raw sewage, etc. can be easily directed to the incinerating pot because the incinerating pot is arranged under the toilet stool.

Raw sewage, etc. and flush water can be handled separately because the shutter or shutters are provided approximately at the midpoint of the length of the drain pipe and the branch pipe is arranged above the shutter or shutters.

During disposal of solid waste, the first shutter opens, and after disposal of solid waste, the first shutter closes and then the second shutter opens to direct raw sewage onto the incinerating pot. Additionally, flushing water can be flushed only when the first shutter is closed. Therefore, even though the first shutter opens during incineration, the second shutter prevents emitting heat and/or bad smell.

The flushed water may be filtered, so that the water filtered can be reused as flushing water. This is effective and economical.

Further, kitchen garbage, etc. also can be incinerated with or without sewage.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will be apparent from the following description, reference being made to the accompanying drawings wherein preferred embodiments of the present invention are clearly shown.

DETAILED DESCRIPTION OF PREFERRED EMBODIMENTS

Preferred embodiments of the present invention will now be described in detail with reference to accompanying drawings.

Figure 1:
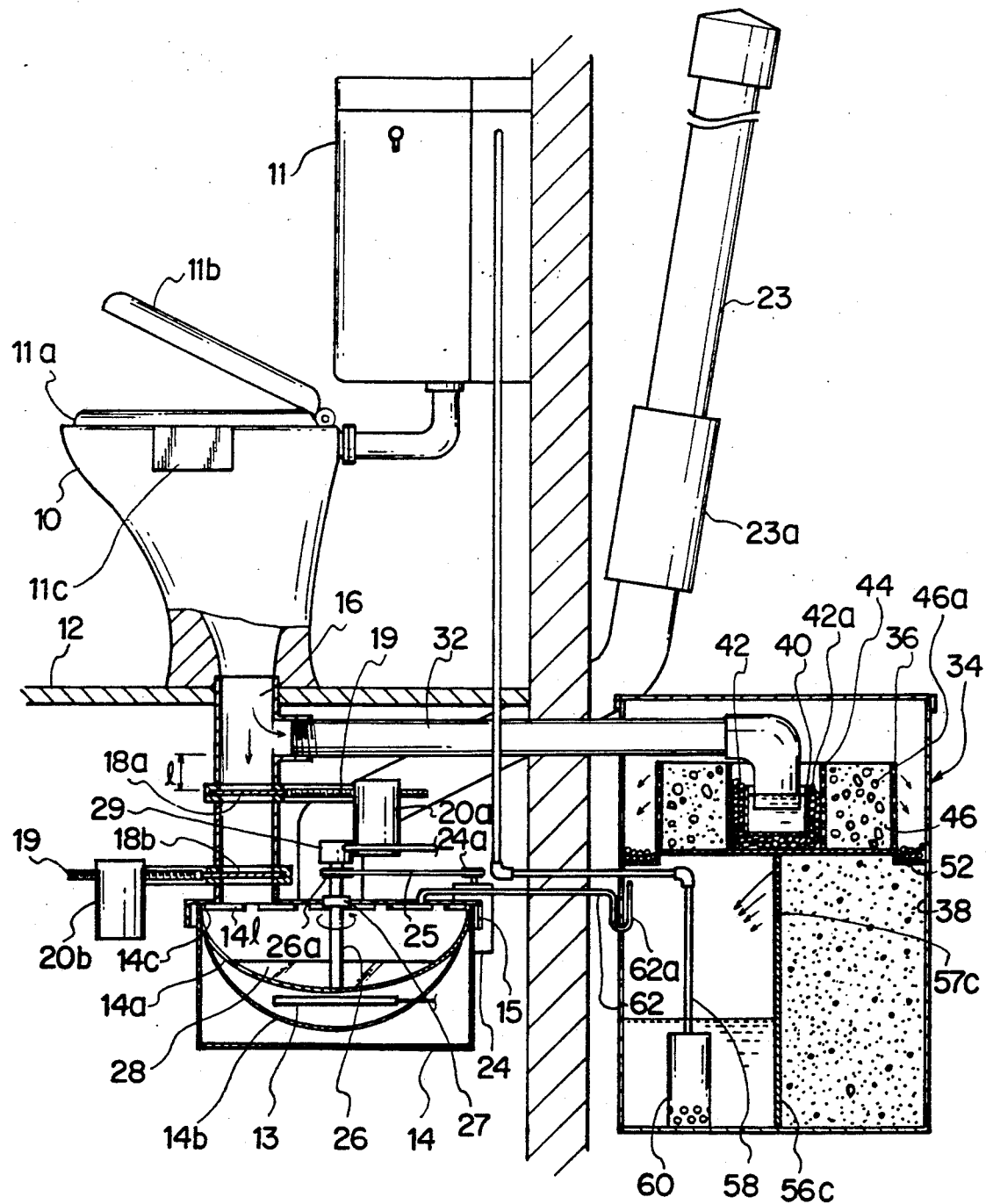
FIG. 1 shows a partially sectional schematic view of a flush toilet of the present invention.

FIG. 1 shows a schematic view of the flush toilet of the present invention.

A toilet stool 10 has a seat section 11a and a cover section 11b. The toilet stool 10 is set on a supporting floor 12. An incinerating pot 14 is provided under the floor 12 on which the toilet stool 10 is set. The incinerating pot 14 and the toilet stool 10 is connected by a vertical drain pipe 16. A flush tank 11 is provided on the inner wall face of the toilet, and the flush tank 11 is connected to the toilet stool 10.

Two shutters for closing the drain pipe 16 at the midway of the drain pipe 16 may be provided. One of the shutters, a second shutter 18b is closer to the incinerating pot 14 than a first shutter 18a. The first and second shutters 18a and 18b are, respectively, able to open and close the drain pipe 16 by actuators 20a and 20b. If the seat section 11a or the cover section 11b is lifted, the actuator 20a is driven by known electrical means to open the first shutter 18a, so that the drain pipe 16 is open. A control circuit 11c may be operatively connected to the toilet stool 10. After use, the control circuit 11c is operated, so that the first shutter 18a is closed and then the second shutter 18b is opened by another known electrical means.

Next, the incinerating pot will be explained.

There is provided an electric heater 13 immediately below the bottom face of a hemispherical pot 14a. The electric heater 13 is covered with a hemispherical reflector 14b so as to reflect heat from the electric heater 13 toward the pot 14a. The opening of the pot 14a is covered with a lid 15. Projections 14c are formed on the fringe of the opening of the pot 14a to support the lid 15, so that a clearance 14c is formed between the fringe of the opening of the pot 14a and the lid 15. Air can be introduced into the pot 14a via the clearance 14c.

Figure 2:
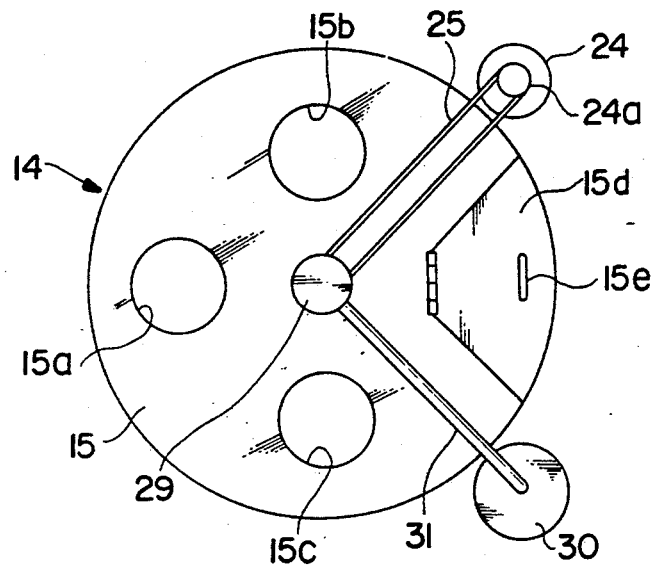
FIG. 2 shows a plan view of an incinerating pot.

FIG. 2 shows a plan view of the incinerating pot 14. The lid 15 of the incinerating pot 14 has three openings. A first opening 15a is connected to the drain pipe 16. A second opening 15b is connected to a smokestack 23. A third opening 15c may be connected to a pipe through which garbage can be introduced into the pot 14a. Further, the lid 15 has an inspection opening 15d which may be opened or closed by hand by gripping a handle 15e. A bearing 27 is provided for rotatably holding a drive shaft 26 in the center of the lid 15. A pulley 26a is fixed at an upper section of the drive shaft 26 which projects upward from the lid 15. The pulley 26a is connected to a pulley 24a, which is fixed on a shaft of a motor 24 adjacent to the incinerating pot 14, by a belt 25. A fan 28 is positioned at the lower end of the drive shaft 26. The fan 28 agitates raw sewage in the incinerating pot 14 for efficient incineration. The fan 28 is formed along the inner face of the incinerating pot 14.

The drive shaft 26 is cylindrical and includes an open lower end. While, a connector 29 is fixed at the top end of the drive shaft 26. The connector 29 does not rotate with the rotation of the drive shaft 26. The connector 29 and a vacuum apparatus 30 are connected to each other by a pipe 31, so that ash in the incinerating pot 14 is withdrawn into the vacuum apparatus 30 via the drive shaft 26, the connector 29 and the pipe 31. Namely, the drive shaft 26 serves not only as a drive shaft but also as an vacuum removal pipe. Therefore, ash of the burnt sewage in the incinerating pot 14 is collected by the fan 28 and sucked to the vacuum apparatus 30 from the lower end of the drive shaft 26.

The smokestack 23 includes a lower end which is connected to the second opening 15b of the lid 15 and extends outside of the house. There is provided a deodorizing section 23a at the midway of the smokestack 23. The deodorizing section 23a includes a deodorizer material (not shown) in order to eliminate any bad smell in the smoke.

At the position immediately above the first shutter 18a, a branch pipe 32 is connected to the drain pipe 16. The front end of the branch pipe 32 is connected to a filtering apparatus 34. The filtering apparatus 34 has a first filtering tank 36 for filtering water from the branch pipe 32 and a second filtering tank 38 accommodated in the first filtering tank 36.

Figure 3:
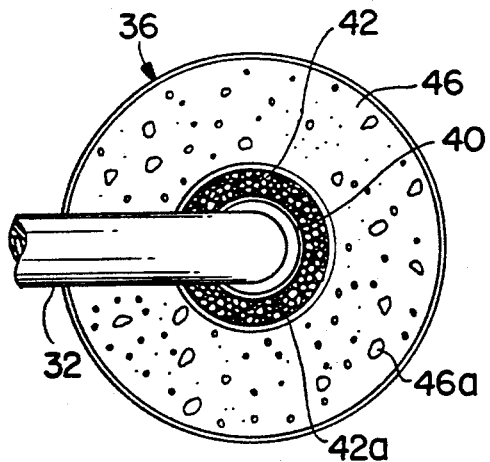
FIGS. 3 and 4 show plan views of part of the filtering apparatus.
Figure 4:
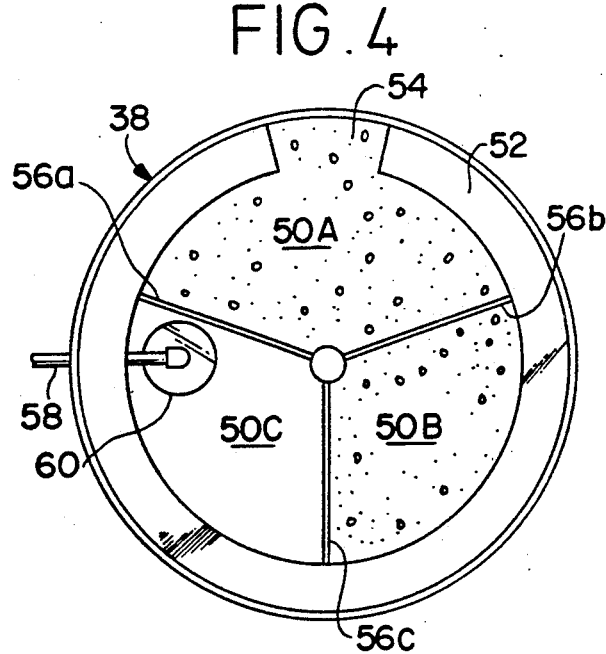

The first and second filtering tanks 36 and 38 will be explained with reference to FIGS. 1, 3 and 4. Note, FIGS. 3 and 4 are plan views of part of the filtering apparatus.

Figure 5:
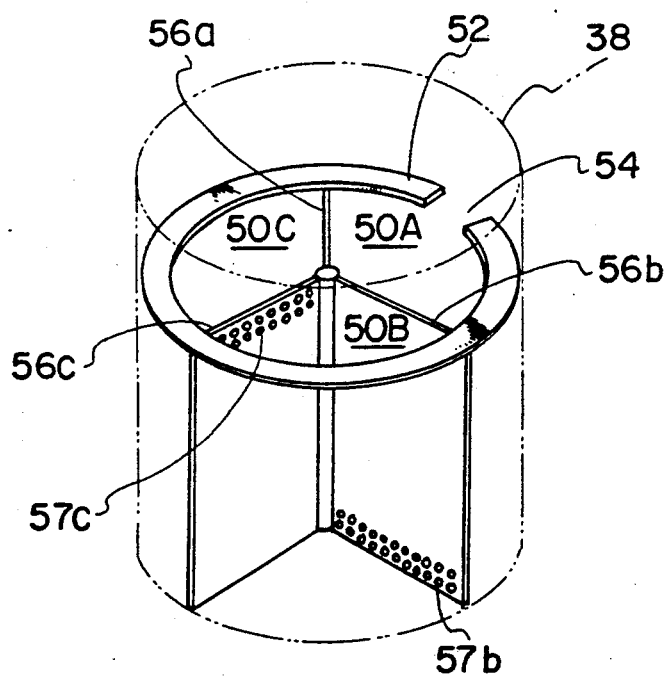
FIG. 5 shows a partial perspective view of the filtering apparatus.
Figure 6:
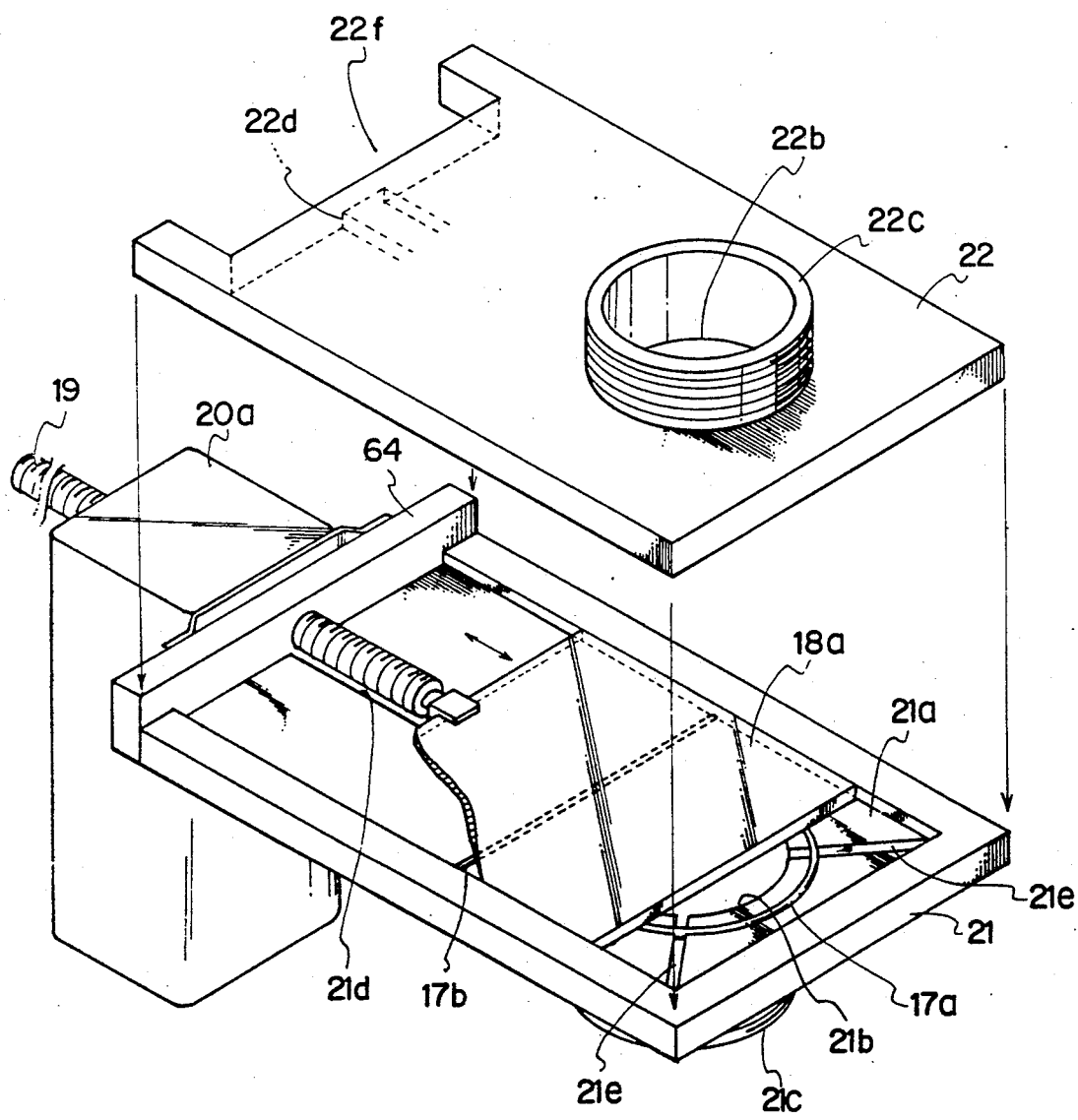
FIG. 6 shows a perspective view of the filtering apparatus.
Figure 7:
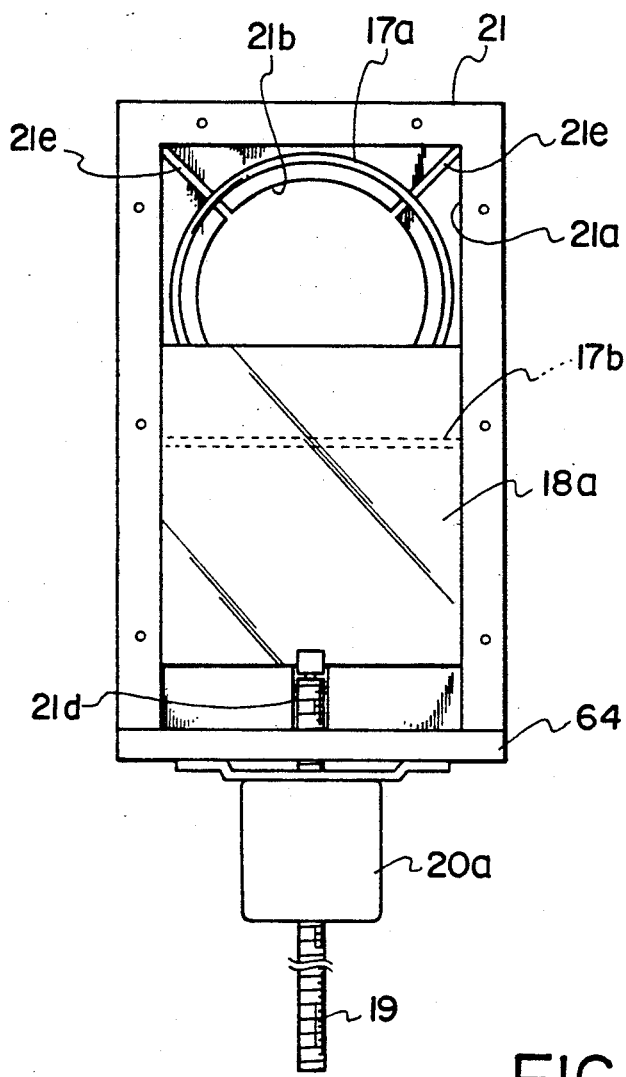
FIG. 7 shows a plan view of one of the supporting frames and a shutter.

The first filtering tank 36 is formed in a shallow cylindrical shape and includes multiple through-holes in the wall. A cup-like receiving section 40 is provided at the center of the first filtering tank 36. The front end of the branch pipe 32 extends to the receiving section 40. The receiving section 40 is supported by deodorizers 42a. The deodorizers 42a are accommodated in a deodorizer chamber 42 which is divided by a cylindrical parting member 44 having multiple through-holes. A donut-like filtering chamber 46 is formed by the parting member 44 and the inner wall face of the first filtering tank 36, filtering materials 46a such as charcoal, sand, etc. are accommodated therein. Water introduced by the branch pipe 32 is impounded in the receiving section 40 and overflows therefrom. The water then flows into the deodorizer chamber 42 and the filtering chamber 46 via the through-holes of the parting member 44. The water, which has been filtered by the filtering material 46a passes through the through-holes 57b of the second parting plate 56b. A plurality of through-holes 57c are positioned in the upper section of the second parting plate 56c. Upon reaching the water level in the second filtering chamber 50B, the water passes through the through-holes 57c of the second parting plate 56c then the water flows into the tank 50c to be impounded therein (see FIG. 5). Note that, FIG. 5 shows the arrangement of the second parting plates 56a, 56b and 56c of the second filtering tank 38 and the first parting plate 52. The tank 50c and the flush tank 11 are connected to each other by a return pipe 58. The front end of the return pipe 58 is connected to a pump 60, which is provided in the tank 50c. When the amount of water in the flush tank 11 is reduced, the pump 60 introduces the water filtered into the flush tank 11.

An overflow-pipe 62 is provided in the tank 50c. The front end of the overflow-pipe 62 is formed in a U-shape as a trap 62a. The rear end of the overflow-pipe 62 is connected to the incinerating pot 14 for introducing water overflowing into the incinerating pot 14.

Next, the shutters will be explained in detail. Note that, both of the shutters have the same structure, so one shutter will be explained with reference to FIGS. 6–9.

The first shutter 18a includes housing plates 21 and 22. The lower housing plate 21 has a cavity 21a having walls on three sides with one side being open. A hole 21b is provided in the bottom of the cavity 21a. A connecting pipe 21c is connected to the hole 21b and extends downwardly. The first shutter 18a in the cavity 21a can be slid toward the open side of the cavity 21a. The open side of the cavity 21a of the housing plate 21 is mounted on a fixed member 64. An actuator 20a is mounted outside of the fixed member 64. A screw rod 19 is positioned through the fixed member 64 and the actuator 20a, and the first shutter 18a is rotatably attached to the front end of the screw rod 19. A groove 21d is provided in the cavity 21a of the housing plate 21, which is moved back and forth by the screw rod 19.

A gear which is engagable with a motor for driving the screw rod 19 is accommodated in the actuator 20a. Namely, the first shutter 18a can be moved back and forth depending on the rotational direction of the screw rod 19 to open and to close the drain pipe 16.

A sealing member 17a is fixed in a groove, which is coaxially arranged relative to the hole 21b in the cavity 21a. Another sealing member 17b, having a length which is the same as the width of the cavity 21a, is fixed to the open side of the cavity 21a. Grooves 21e are positioned from the corners of the cavity 21a to the hole 21b. The grooves 21e and the hole 21b are connected to each other.

Figure 8:
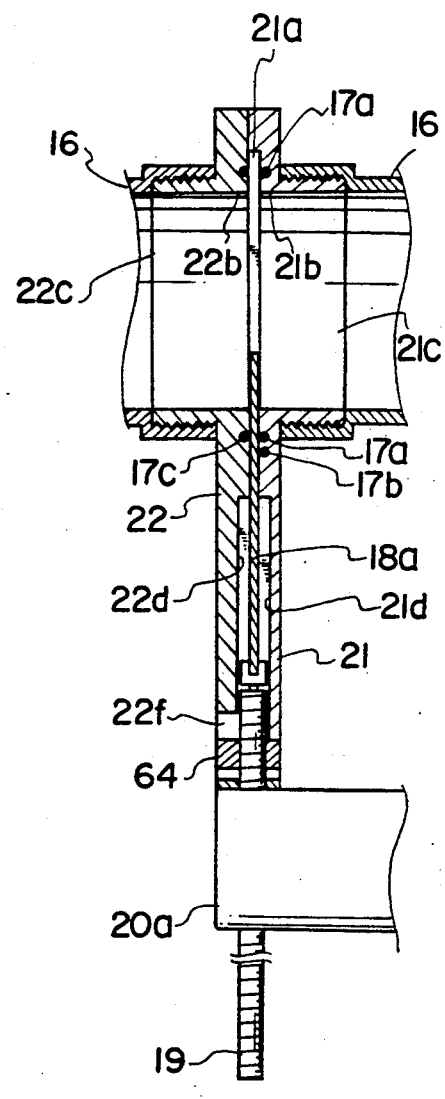
FIG. 8 shows a longitudinal sectional view of the shutter mechanism.
Figure 9:
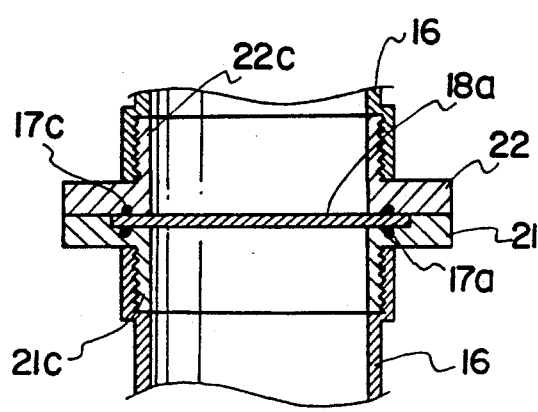
FIG. 9 shows a transverse sectional view of the shutter mechanism.

The housing plate 22 covers the cavity 21a of the housing plate 21 and is fixed on the upper face of the housing plate 21 by screws, etc. The housing plate 22 includes a hole 22b, which is formed at the position corresponding to the hole 21b of the housing plate 21. A connecting pipe 22c is connected to the hole 22b and extends upwardly. A sealing member 17c is coaxially positioned relative to the hole 22b (see FIGS. 8 and 9). The housing plate 22 is mounted on the housing plate 21 to form a slidable mechanism for the first shutter 18a. Note that, a groove 22d is formed on the bottom face of the housing plate 22. The screw rod 19 can be moved in the groove 22d. An opening 22f is opened at the fixed member 64 side of the housing plate 22. As illustrated in FIGS. 8 and 9, the drain pipe 16 is connected to connecting sections 21c and 22c of the housing plates 21 and 22.

Water on the first shutter 18a is normally prevented from leaking outside of the sealing member. However, even if water leaks outside thereof, the water is directed back to the hole 21b via the groove 21e.

Successively, the action of the flush toilet described in the above embodiment will be explained in order.

(1) The seat section 11a or the cover section 11b is lifted to open the first shutter 18a. Note, the second shutter 18b still closes the drain pipe 16.

(2) Waste material is deposited in the toilet.

(3) Thereafter the first shutter 18a is closed and the second shutter 18b is opened by operation of the control section 11c, then raw sewage falls into the incinerating pot 14. Note that, flushing water or water for washing the anal region of a user can flow only when the first shutter 18a closes the drain pipe 16, so that excess water cannot flow when the first shutter opens.

(4) Upon the passing of a prescribed time, the second shutter 18b automatically closes.

(5) After the first shutter 18a closes the drain pipe 16, water can be flushed. Flushing water falls through the drain pipe 16 and is introduced to the filtering apparatus 34 by the first shutter 18a and the branch pipe 32. Further, if necessary, water for washing the anal region of a user is also introduced thereto with the flushing water. Note that, the branch pipe 32 and the first shutter 18a are not set at the same level, so water will be contained within the section 1. This water will prevent raw sewage from sticking on the second shutter 18b because the first shutter 18a will open before using the toilet so the water contained therein will fall onto the second shutter 18b.

(6) The water introduced through the branch pipe 32 is delivered to the receiving section 40 and overflows from the opening of the receiving section 40 to the deodorizer chamber 42 and then flows into the filtering chamber 46 via the partition member 44. The water filtered in the filtering chamber 46 flows out from the wall of the first filtering tank 36, and the water flows into the first filtering chamber 50A via the partition member 52 and the exit 54 to filter therein. The water filtered in the first filtering chamber 50A flows into the second filtering chamber 50B via the multiple through-holes 57b of the second partition plate 56b. Upon reaching the water level of the multiple through-holes 57c of the second parting plate 56c in the second filtering chamber 50B then the water flows into the tank 50c.

(7) When water in the flush tank 11 is flushed, the water in the tank 50c is introduced back to the flush tank 11 via a return pipe 58 by a pump 60. Note that, if the water level in the flush tank 11 is lower than a prescribed level, water from the water supply system will be added thereto.

(8) When water in the tank 50c overflows, the water will be introduced to the incinerating pot 14 via the overflow-pipe 62.

(9) Waste material or raw sewage in the incinerating pot 14 is incinerated by the electric heater 15 for heating the incinerating pot 14. The heat from the electric heater 15 can be efficiently emitted to the pot 14a by the reflector 14b. In this incineration, the fan 28 agitates raw sewage for efficient incineration. Note that, air can be introduced into the incinerating pot 14 via the clearance 14 1 between the fringe section of the opening of the pot 14a and the lid 15. Additionally, heated air with a bad smell, etc. may be exhausted outside via the smokestack 23. In the smokestack 23, the air can be deodorized by the deodorizing section 23a.

(10) After incinerating sewage, the electric heater 15 is turned off. Control of the electric heater 15 may be executed by known electrical means. Further, the fan 28 rotates to collect ash to the center lower section of the incinerating pot 14, and then the vacuum apparatus 30 withdraws the ash via the pipe-like drive shaft 26. Note that, in case of using the toilet during incinerating sewage, the action (1)-(7) may be executed. Even though the first shutter 18a opens during the incineration, the lower second shutter 18b still closes so that no heat air or bad smell is emitted by the toilet.

Figure 10:
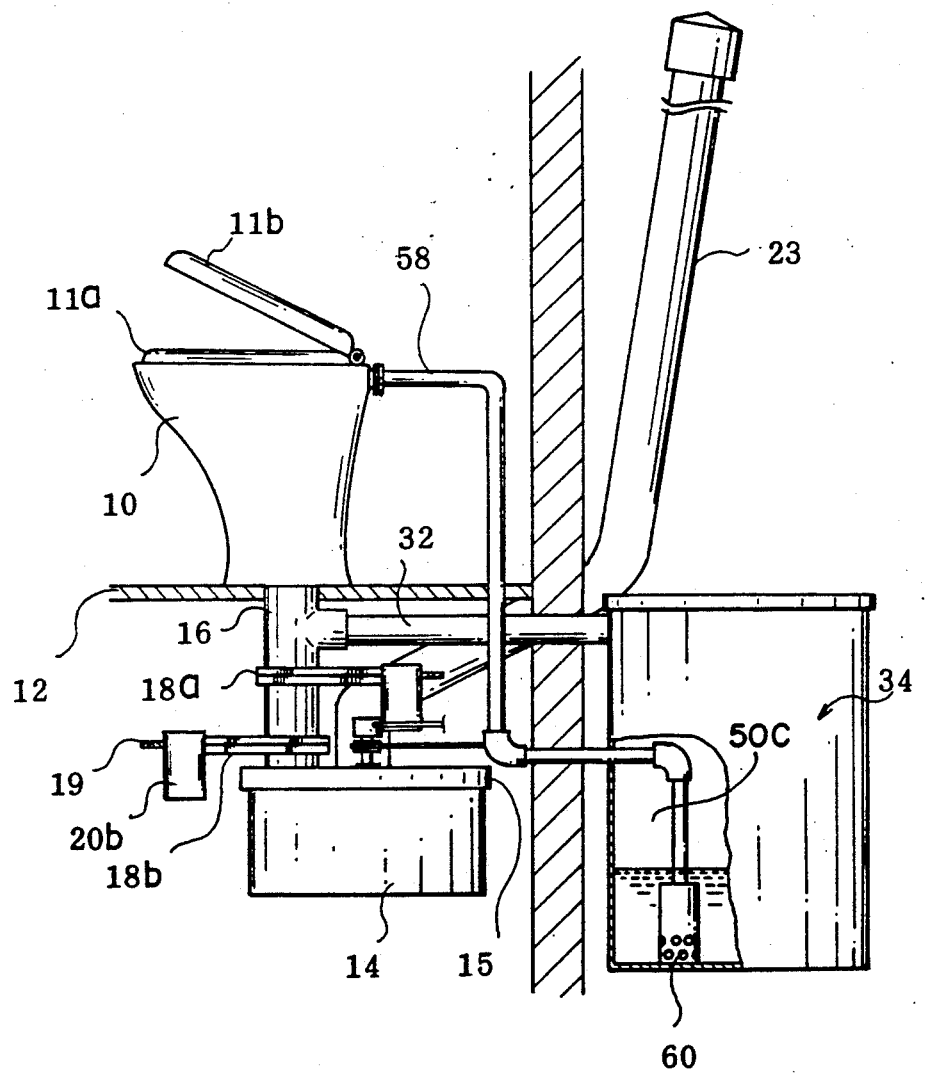
FIG. 10 is a view of the flush toilet without a flush tank.

Next, another embodiment will be described. FIG. 10 shows another embodiment without the flush tank 11 of the former embodiment. In this embodiment, the return pipe 58, extends from the tank 50c of the filtering apparatus 34 and is directly connected to the toilet stool 10 in order to return the water for flushing the toilet stool 10. With this structure, flushing water is introduced back by the pump 60 when the toilet stool 10 is flushed. This embodiment has an advantage so that the necessary area required for the toilet can be reduced. Note that, water for washing a user's anal region should be supplied from the water supply system, and if water in the tank 50c is reduced, water should be supplied by proper means such as a water supply system.

Figure 11:
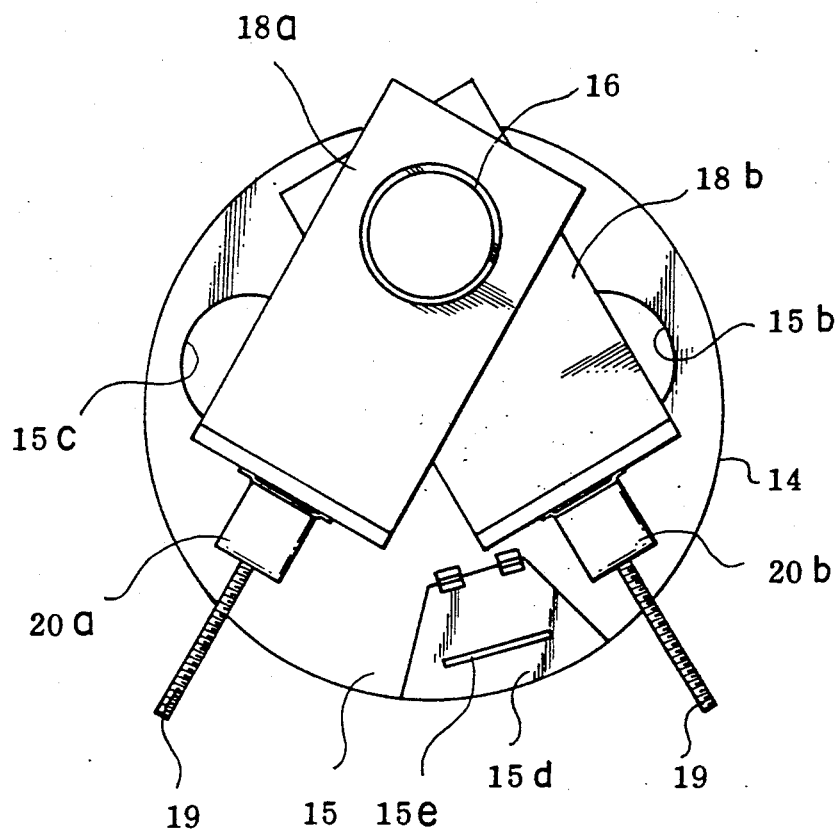
FIG. 11 shows a plan view indicating the layout of two shutters.

In FIG. 1, the first shutter 18a and the second shutter 18b are arranged to face each other but both shutters 18a and 18b and both actuators 20a and 20b may be arranged above the incinerating pot 14 as shown in FIG. 11 thus resulting in a reduction in the space necessary for the shutters.

Figure 12:
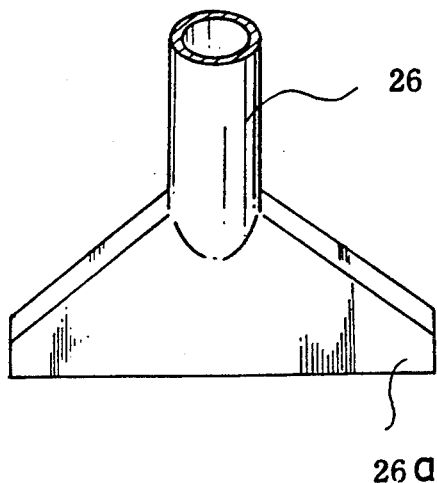
FIG. 12 shows a partial perspective view of another example of a drive shaft.

In FIG. 1, the fan 28 is fixed at the lower end of the drive shaft 26 but the lower end of the drive shaft 26 may be formed as shown in FIG. 12 to serve as fan and vacuum mouth. In this case, the lower end of the drive shaft 26 should be slightly separate from the inner bottom face of the pot 14a.

Figure 13:
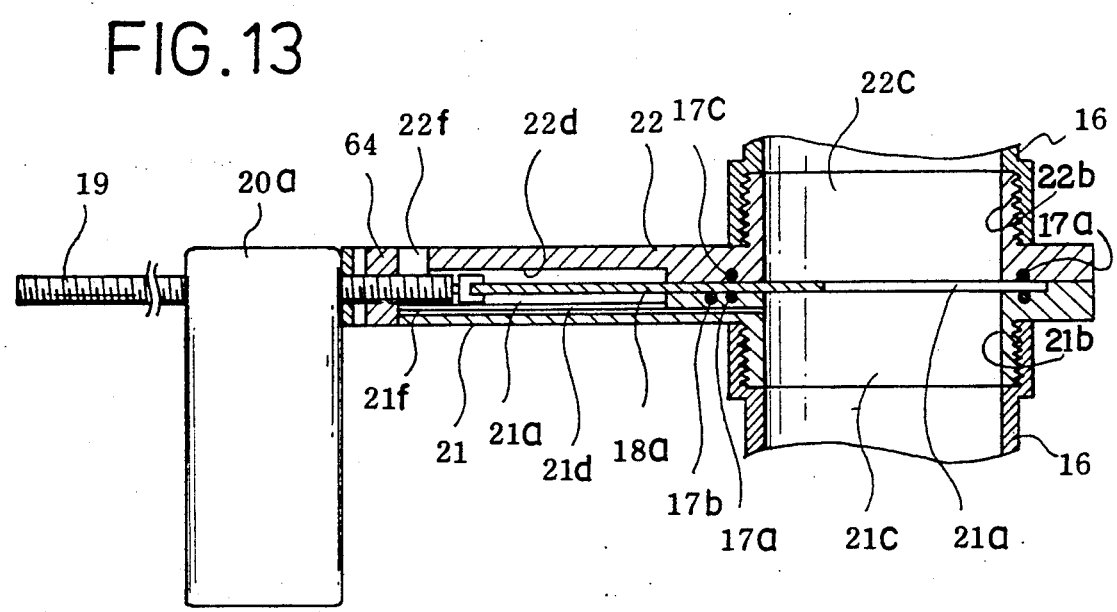
FIG. 13 shows a sectional view of the shutter mechanism.
Figure 14:
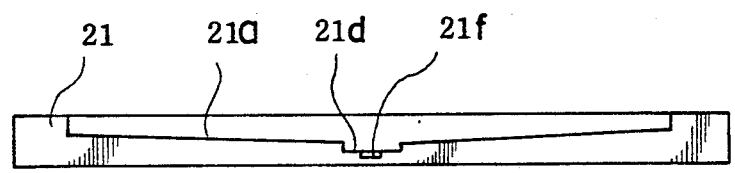
FIG. 14 shows a side view of a sliding plate.

Next, another shutter will be explained. A shallow discharge groove 21f may be provided on the bottom face of the groove 21d of the cavity 21a of the housing plate 21 housing the shutter in order to discharge water which has leaked over the sealing member 17b. The discharge groove 21f is formed, as shown in FIG. 13, in communication with the hole 21b so as to permit water to flow via the groove 21f and below the sealing members 17a and 17b. With this structure, the water which has leaked will be discharged to the hole 21b via the discharge groove 21f. Note that, the discharge can be smooth if the cavity 21a is inclined toward the groove 21d.

Figure 15:
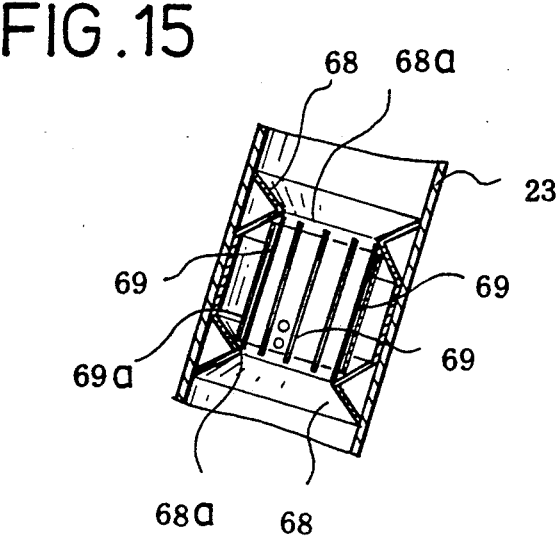
FIG. 15 shows a partial sectional view of a deodorizing section of a smokestack.

In the former embodiment, the deodorizing section 23a has deodorizers positioned therein. An electric heater may be used for deodorization. As shown in FIG. 15, a heat reflector 68 having lower and upper projections for reducing the diameter of the smokestack 23 is attached to the mid section of the smokestack 23 for reflecting heat from heaters 69. The electric heaters 69 are positioned between top portions of the lower and upper projections. The heaters 69 are rounded by a plate 69a with through-holes with this structure, smoke exhausted through the smokestack 23 can be completely combusted, so that no bad smell will be emitted.

In FIG. 1, a single filtering apparatus 34 is provided for the single incinerating pot 14. For example, a plurality of toilet stools may be positioned in a hotel. In this case, a plurality of incinerating pots 14 are provided for each toilet stool 10. However, a single filtering apparatus 34 may be provided for a plurality of incinerating pots 14.

Figure 16:
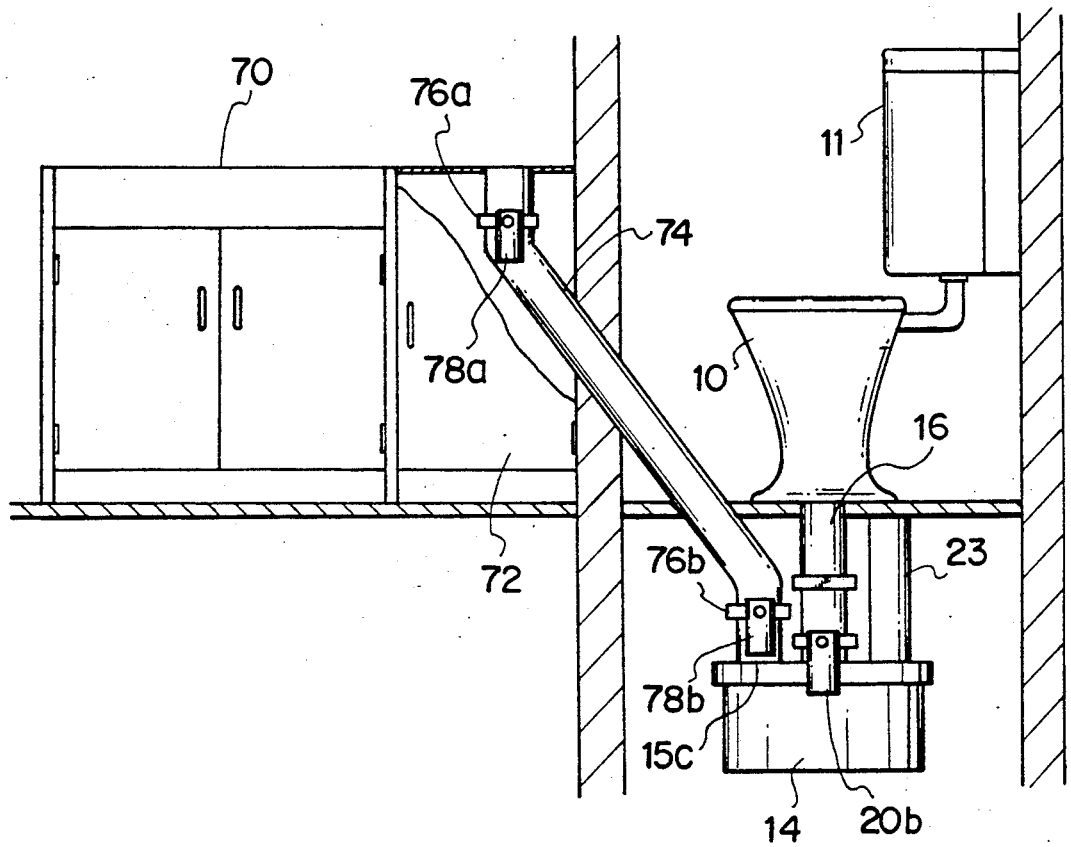
FIG. 16 shows a front schematic view of another embodiment.
Figure 17:
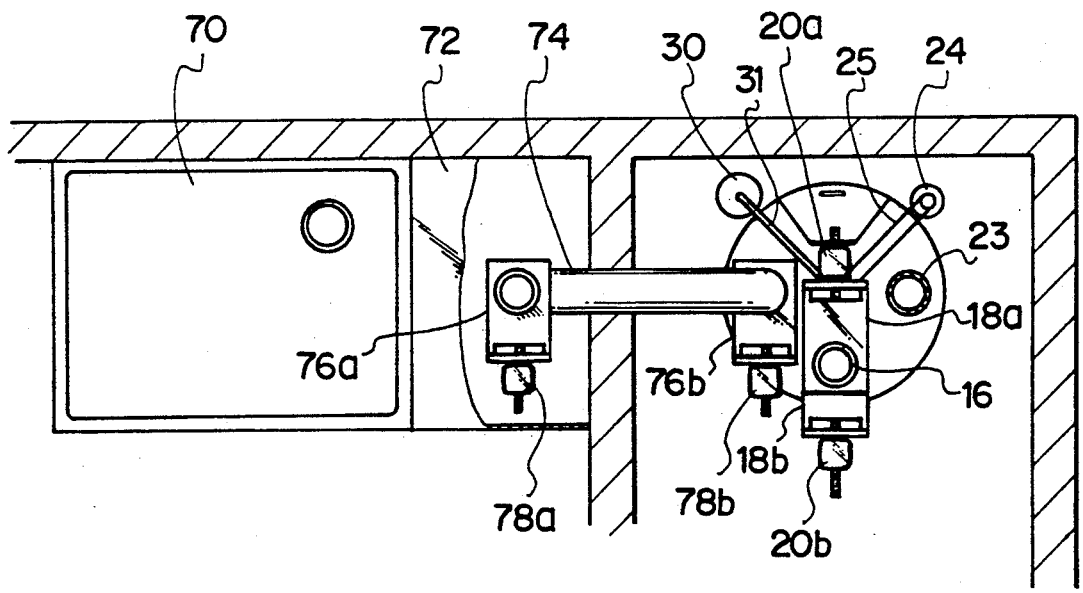
FIG. 17 shows a plan schematic view thereof.

Next, another embodiment, which can incinerate kitchen garbage with raw sewage, will be explained. FIGS. 16 and 17 show a portion of a kitchen disposed adjacent to the toilet. A cupboard 72 is arranged beside a sink 70. An upper end of the pipe 74 is opened to the upper face of the cupboard 72. The lower end of the pipe 74 is connected to the third opening 15c of the incinerating pot 14. Two shutters 76a and 76b are provided at the midway of the pipe 74. The first shutter 76a and second shutter 76b are respectively driven by a first actuator 78a and a second actuator 78b to close and to open the pipe 74. Note that, the structure and interconnection of the shutters 76a and 76b and actuators 20a and 20b are the same as the structure and interconnection of the shutters 18a and 18b and the actuators 20a and 20b of the former embodiment.

When garbage is thrown into the incinerating pot 14, the first actuator 78a is operated to open the first shutter 76a. After garbage is thrown into the pipe 74, the first shutter 76a is closed and then the second shutter 76b is opened so as to introduce garbage onto the incinerating pot 14. Garbage can be incinerated with sewage in the incinerating pot 14. Note that, the incinerating pot 14 can incinerate only sewage, only garbage, or the both.

Preferred embodiments of the present invention have been described in detail, many modifications such as the structure of the filtering apparatus, shape or structure of the incinerating pot, or shutter mechanism, etc. can be allowed without deviating the spirit of the invention.

The each of flush toilet of the embodiments as described above has the following advantages. Raw sewage can be easily directed to the incinerating pot because the incinerating pot is arranged under the toilet stool.

Raw sewage and flush water can be handled separately because the shutters are provided in the midway of the drain pipe and the branch pipe is provided above the shutters.

During disposal, the first shutter opens, and after disposal the first shutter closes and then the second shutter opens to permit waste material or raw sewage to fall into the incinerating pot. Additionally, flushing water can be flushed only when the first shutter is closed. Therefore, even if the first shutter opens during incineration, the second shutter prevents emitting heat or bad smell.

Moreover, water flushed may be filtered, so that the water filtered can be reused as flushing water. This method is effective and economical.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A flush toilet comprising:

an incinerating pot having a heater therein for incinerating solid waste, said incinerating pot being arranged below a toilet stool;

a drain pipe having a first end and a second end and extending a predetermined length and connecting said incinerating pot and said toilet stool;

a shutter arranged across said drain pipe downstream of said toilet stool and approximately midway along the length of said drain pipe, said shutter selectively opens said drain pipe during solid waste disposal and closes after completing solid waste disposal; and a branch pipe attached to said drain pipe and arranged above said shutter for permitting removal of flushed water separately from, and after the disposal of the solid waste.

2. The flush toilet according to claim 1, wherein said branch pipe is connected to a filtering apparatus, and said toilet stool and a tank for containing water filtered by said filtering apparatus are connected to each other by a return pipe.

3. The flush toilet according to claim 1, wherein said incinerating pot includes a lower central portion, and further includes a fan for agitating solid waste in said incinerating pot and means for exhausting ash therefrom.

4. The flush toilet according to claim 1, further comprising means for introducing additional solid waste into said incinerating pot whereby the additional solid waste can be incinerated.

5. A flush toilet comprising:

an incinerating pot having a heater therein for incinerating solid waste, said incinerating pot being arranged below a toilet stool;

a drain pipe having a first end and a second end and extending a predetermined length and connecting said incinerating pot and said toilet stool;

a first shutter arranged across said drain pipe downstream of said toilet stool and approximately midway along the length of said drain pipe, said first shutter selectively opens said drain pipe during solid waste disposal and closes after completing solid waste disposal;

a second shutter arranged downstream of said first shutter along the length of said drain pipe, said second shutter selectively closes said drain pipe while said first shutter opens said drain pipe and selectively opens said drain pipe when said first shutter closes said drain pipe; and a branch pipe attached to said drain pipe and arranged above said first shutter for permitting removal of flushed water separately from, and after the disposal of the solid waste.

6. The flush toilet according to claim 5, wherein said branch pipe is connected to a filtering apparatus, and said toilet stool and a tank for containing water filtered by said filtering apparatus are connected to each other by a return pipe.

7. The flush toilet according to claim 5, wherein said incinerating pot includes a lower central portion, and further includes a fan for agitating solid waste in said incinerating pot and means for exhausting ash therefrom.

8. The flush toilet according to claim 5, further comprising means for introducing additional solid waste into said incinerating pot whereby the additional solid waste can be incinerated.

* * * * *